(12) United States Patent  
Douglas et al.

(10) Patent No.: US 9,338,617 B2  
(45) Date of Patent: May 10, 2016

(54) SMART MONITORING SENSOR SYSTEM FOR MONITORING MOBILITY

(71) Applicants: Joel Douglas, Groton, CT (US); Jeffry Tola, Dayville, CT (US)

(72) Inventors: Joel Douglas, Groton, CT (US); Jeffry Tola, Dayville, CT (US)

(*) Notice: Subject to any disclaimer, the term of this patent is extended or adjusted under 35 U.S.C. 154(b) by 10 days.

(21) Appl. No.: 14/312,987

(22) Filed: Jun. 24, 2014

(65) Prior Publication Data

US 2014/0375451 A1  Dec. 25, 2014

Related U.S. Application Data

(60) Provisional application No. 61/838,949, filed on Jun. 25, 2013.

(51) Int. Cl.
| | |
|---|---|
| G08B 1/08 | (2006.01) |
| H04W 4/14 | (2009.01) |
| H04W 4/00 | (2009.01) |

(52) U.S. Cl.
CPC ............... *H04W 4/14* (2013.01); *H04W 4/008* (2013.01)

(58) Field of Classification Search
CPC .................................................. A61B 5/0002
USPC .......... 340/539.12, 539.22, 870.01; 455/456.1
See application file for complete search history.

(56) References Cited

U.S. PATENT DOCUMENTS

| | | | |
|---|---|---|---|
| 4,179,692 A | 12/1979 | Vance | |
| 4,295,133 A | 10/1981 | Vance | |
| 5,363,771 A | 11/1994 | Warren | |
| 5,633,627 A | 5/1997 | Newham | |
| 5,640,145 A | 6/1997 | Newham | |
| 7,870,695 B2 | 1/2011 | Manson | |
| 8,248,256 B1 * | 8/2012 | Gerardi | G08B 21/20 340/604 |
| 8,970,392 B2 * | 3/2015 | LaLonde | A61N 1/37282 340/870.01 |
| 2008/0001735 A1 * | 1/2008 | Tran | G06F 19/3418 340/539.22 |
| 2008/0129153 A1 | 6/2008 | Roundy et al. | |
| 2014/0135612 A1 * | 5/2014 | Yuen | A61B 5/02405 600/407 |
| 2014/0266693 A1 * | 9/2014 | Moulton | G08B 21/02 340/539.12 |
| 2015/0102925 A1 * | 4/2015 | Foldyna | A61B 5/746 340/539.12 |

* cited by examiner

*Primary Examiner* — Benjamin C Lee  
*Assistant Examiner* — Israel Daramola

(57) ABSTRACT

The present invention provides devices, systems, and methods for remotely alarming an intelligent hand held device when a sensor on a stair assist device is made thereby signaling an event which is of concern for a patient caregiver. In accordance with a first aspect of the invention, there is provided a remote transmitter for use with a smart phone or tablet connectable to sensors such as end of travel sensors for a stair climbing assist device or a mat, a photoelectric sensor, toilet or chair sensor and providing that information via wireless peer to peer communication to a smart phone or tablet so that a caregiver can react appropriately to the information. The remote transmitter device contains a conventional switch detection circuit and a peer to peer communications circuit such as Bluetooth.

17 Claims, 12 Drawing Sheets

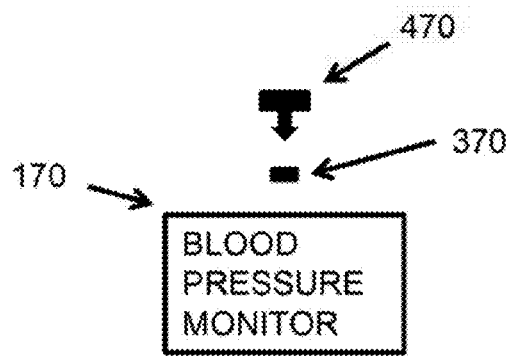
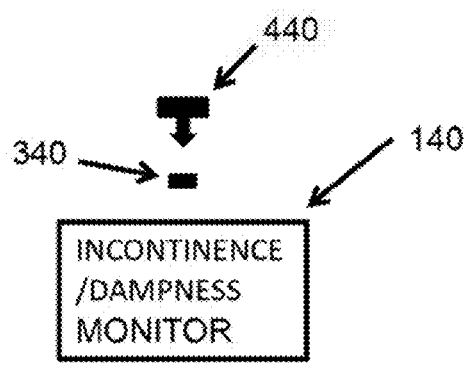
FIGURE 8
FIGURE 9
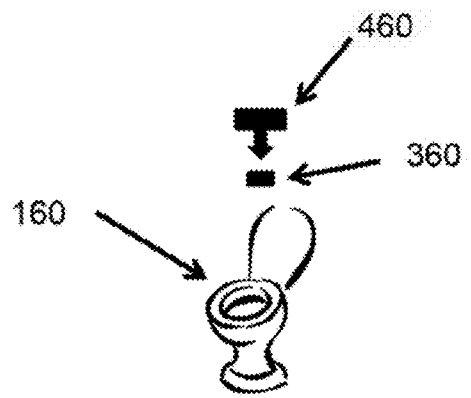
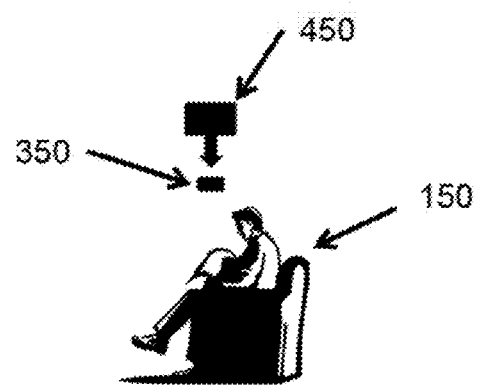
FIGURE 10
FIGURE 11

SMART MONITORING SENSOR SYSTEM FOR MONITORING MOBILITY

CROSS REFERENCE TO RELATED APPLICATIONS

This application claims priority to U.S. Provisional Patent Application Ser. No. 61/838,949, filed 25 Jun. 2013, entitled "Smart sensor system for use with an electronic patient monitor" the contents of which are incorporated herein by reference in its entirety.

BACKGROUND OF THE INVENTION

1. Field of the Invention

This invention relates generally to monitoring systems and more particularly concerns devices and system's used to monitor individuals with compromised mobility and capable of using stair climbing or lift assist machines in homes or in medical environments such as hospitals, institutions and other care-giving environments.

2. Description of Related Art

DEFINITIONS

As used herein, "patient and individual" are used interchangeably and in some case together to mean the individual or individuals that the caregiver is monitoring.

As used herein, "switch and sensor" are used interchangeably and in some case together to mean a device to sense the state of an input for the remote transmitter.

As used herein, "stair assist device" means a device for transporting a person up and down stairs along the rake of the stairs.

As used herein, "Smart Phone" is a device that has both wireless telephone communication protocol and a secondary peer to peer communication protocol As used herein, "Tablet" is a device that has both wireless internet connection communication protocol and a secondary peer to peer communication protocol It is well documented that certain individuals, including elderly, infants, children and post-surgical patients, are at a heightened risk of falling. There are many reasons for this but, broadly speaking, these individuals are often afflicted by gait and balance disorders, weakness, dizziness, confusion, visual impairment, and postural hypotension (i.e., a sudden drop in blood pressure that causes dizziness and fainting), all of which are recognized as potential contributors to a fall. Additionally, cognitive and functional impairment, and sedating and psychoactive medications are also well recognized risk factors.

A fall places the patient at risk of various injuries including sprains, fractures, and broken bones; injuries which in some cases can be severe enough to eventually lead to a fatality. Of course, those most susceptible to falls are often those in the poorest general health and least likely to recover quickly from their injuries. In addition, to physiological consequences of fall-related injuries, there are a variety of adverse economic and legal consequences that include the actual cost of treating the victim and, in some cases, caretaker liability. In addition, young children getting up a night unmonitored can result in injury to the child due to falling or other danger.

In the past, it has been commonplace to treat these individuals that are prone to falling by limiting their mobility through the use of restraints, or audible monitors such as traditional baby monitors that provide a closed-circuit visual or audio feed, wired monitors for beds and chairs that alarm when the patient gets up from the chair or bed. The underlying theory is that if the individual is not free to move about or that they are under constant surveillance, they will not be as likely to fall. However, research has shown that restraint-based or closed-circuit human monitored visual or audio feed strategies are not adequate for all types of individuals and that restraint-based systems are often more harmful than beneficial and should generally be avoided. Also with the increase in the aging population the number of patients afflicted with Alzheimer's and dementia has drastically increased. These patients need additional monitoring not envisioned by the current products available in the market place. The emphasis today is on the promotion of mobility rather than immobility. Among the more successful mobility-based strategies for fall prevention include interventions to improve functional status, reduction of environmental hazards, and staff monitoring of high-risk hospital patients, children and nursing home residents.

Of course, monitoring, as effective as that care strategy might appear to be in theory, suffers from the obvious practical disadvantage of requiring additional staff if the monitoring is to be in the form of direct observation. The closed-circuit visual or audio feed monitor requires the parent or caregiver to be vigilant about monitoring the feed to sense the problem in the distant room. Thus, the trend in patient monitoring has been toward the use of electrical devices to signal changes in a patient's circumstance to a caregiver who might be located either nearby or remotely at a central monitoring facility, such as a nurse's station or parents' bedroom. These systems are currently sold by Posey, Stanley Healthcare Solutions, Life Alert, among others and focus on the monitoring of individuals in either the bed, chair or toilet situations. This leaves the individual at risk when they are moving about their normal life within the confines of the caregiving environment. The problems arise with the inability to utilize stairs, monitor when the patient exits or leaves an area, or needs assistance from the caregiver. The caregiver assistance is covered in medical facilities with wired call buttons but this is not easily addressed when the patient is not at the call button enabled location such as a toilet or bed. The obvious advantage of an electronic monitoring arrangement is that it frees the caregiver to pursue other tasks away from the patient. However, the state of the art system require to individual being cared for to push a tactile button device which they may or may not have the strength or motor skills to do or the caregiver is limited to monitoring the individual from a specific location which limits the usability of the monitoring system.

The present invention relates generally to switch and sensor devices connected to remote transmitter. Specifically, the present invention is directed to an easily operable switch or sensor on a remote transmitter for use in a system consisting of a stair assist machine or lift such as the Elan SRE-3000 sold by Bruno http://www.bruno.com/stairlift-elan.html that communicates with an intelligent device that is monitored by a caregiver and is in communication with all the switches and sensors in the facility or home. The present invention is of particular value to those individuals who must rely on assistance from a dedicated caregiver or staff of caregivers. The ability for the invention to utilize a range of switches and sensors including tactile, pressure, acceleration, speed or motion sensing to transmit critical information to the caregiver is unique and the ability for the caregiver to get the information from their smart tablet or phone makes the installation and use of the invention easy.

Due to the high cost of in-patient health care for the physically incapacitated, the increasing expense of convalescent homes for the aged, and the desire of many such persons to be independent, the numbers of aged persons or those with fragile health who elect to live alone are becoming very large. The changing economics of society has also resulted in many young children being at home alone after school or when their parents are away at work. The lack of or limited supervisory care for these people has led to potentially dangerous situations in the household and a means of providing information to a caregiver on the location and status of the individual being cared for is critical in providing the caregiver flexibility and the ability to administer proper care and supervision.

Generally speaking, electronic monitors work by first sensing an initial status of a patient, and then generating a signal when that status changes, e.g., using the stair assist device to move from one floor to the next, the patient is sitting on the stair assist chair, has sat up in bed, left the bed, risen from a chair or toilet seat, has exited the safe room, has entered the safe room, etc., any of which situations could pose a potential cause for concern in the case of an at-risk individual. One of the primary causes of broken bones in the elderly are falls associated with stairs. The modern stair assist machines embolden the patients to use these machines without the help of the caregiver. It is true that with the advent of stair mobility devices the problems associated with patients falling has been minimized but the professional caregivers still desire to be there to assist the patient with the transfer to and from the stair the landings. To accomplish the notification of the caregiver without unduly hampering the patient being cared for, there needs to be a monitoring system to notify the caregiver that the patient is using the stair assist machine. It needs to be easy to install and simple to operate.

The existing electronic bed and chair monitors typically use a pressure sensitive switch in combination with a separate monitor/microprocessor. In a common arrangement, a patient's weight resting on a pressure sensitive mat (i.e., a "sensing" mat) completes an electrical circuit, thereby signaling the presence of the patient to the microprocessor. When the weight is removed from the pressure sensitive switch, the electrical circuit is interrupted, which is sensed by the microprocessor. The logic that drives the monitor is typically programmed to respond to the now-opened circuit by triggering some sort of alarm, either electronically (e.g., to the nursing station via a conventional nurse call system) or audibly (via a built-in siren). The following patents are representative of monitoring devices that operate in this general fashion may be found in:

U.S. Pat. No. 4,179,692, issued to Vance, describes a switch placed in a bed under a patient, includes contacts which can make or break a connection to a signal processing circuit.

U.S. Pat. No. 4,295,133, issued to Vance, describes a switch placed in a bed under a patient comprises two spaced parallel strips of insulating material carrying contact means.

U.S. Pat. No. 4,700,180, issued to Vance, describes a monitoring system for a bed patient comprising a binary signal generating means to provide a first signal when the patient is in the bed and a second signal when the patient is out of the bed.

U.S. Pat. No. 5,633,627 issued to Newham, describes a system connectible to an electrical power source for monitoring a short term care device having a sensor thereon for detecting the presence of a patient on the device includes a microprocessor and a plurality of circuits connected to the microprocessor.

U.S. Pat. No. 5,640,145 issued to Newham, describes a system for monitoring an infant-bearing device includes a microprocessor responsive to a resident program.

The disclosures of the above patents are incorporated herein by reference

Additionally, many variations of this arrangement are possible and electronic monitoring devices that track changes in other patient variables (e.g., incontinence or wetness/enuresis, patient activity, etc.) are available for some applications. Monitors do not exist that can be used with the stair assist devices as described in:

U.S. Pat. No. 7,870,695 issued to Manson et. al., describes an apparatus for assisted walking on stairs or other sloped surfaces or U.S. Pat. No. 5,363,771 issued to Warren describes a portable system for aiding persons in ascending or descending stairways or U.S. Pat. No. 4,823,524 issued to Bednar describes a device for aiding a person in walking up and down a staircase which has at least one railing running alongside the disclosures of which are incorporated herein by reference.

However, present mats and other sensing devices for use in patient monitoring suffer from a number of disadvantages and do not address all the issues that are of a concern to a caregiver. Many caregivers have patients that are suffering from Alzheimer's or dementia as well as being mobility challenged.

A system that would alert the caregiver that the patient is in transit going up or down a staircase in the home without being overly obtrusive or expensive would be a great advantage to the caregiver. The invention solves this problem by creating a sensor system that can be mounted to a traditional stair assist device as found in stair assist devices. It also solves the problem of creating electronic boundary at doors and portals to a room or building by integrating a portal sensor that can distinguish if the portals breached by an individual going into or out of the area under monitoring such as going to the stairwell or landing. Sensors that rate of motion, or acceleration can monitor erratic, unexpected or sudden motion can detect difficult operation, falling, unsteady movement up or down the stairs by the patient or malfunction of the assist devices. This way the alert can be sent to the caregiver and they will know if the patient has left or that another family member or employee has come into the area or left the area such as a stair landing and will be able to go and assist them to transit the stairs. Additionally, the caregiver will be notified of an unexpected event during the transit up or down the stairs Stairs present the most dangerous situation for falling for elderly and young patient. The stair assist devices available on the market today embolden these individuals to attempt the transit of stairs without assistance. The caregivers need timely information so they can supervise these transits. Therefore there needs to be a simple and wireless monitoring system which is designed to provide that information.

Additionally, a monitor manufacturer would like to provide a means of monitoring an individual by the caregiver when the caregiver is away from a monitoring node. This problem arises when the caregiver is tending to either another individual or in a different room than the alarm node.

Still further, it would be useful in some circumstances to be able to automatically identify which individual being monitored has gotten up and which room they are associated with. This would arise when a caregiver is monitoring more than one individual such as two children in different rooms.

Finally, it is a problem that few of the current mats and monitoring systems are wireless and cannot be easily installed in a home environment. Lastly, the ability to sense temperature in the monitored room or temperature of the individual being monitored may be important.

As is well known in the monitor arts, there has been a need for an invention to address and solve the above-described problems. Accordingly, it should now be recognized, as was recognized by the present inventors, that there exists, and has existed for some time, a very real need for a smart, low cost monitoring system that would address and solve the above-described problems.

Also there exists a need for the monitor system to be able to communicate with a wireless network such as in a caregiver situation within a private home.

Before proceeding to a description of the present invention, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The present invention provides devices, systems, and methods for remotely contacting a caregiver that the individual or individuals being cared for are moving or have moved from a specific location. More specifically, it provides a means of alerting the caregiver when a patient is going to use a stair assist device so the caregiver can provide assistance thereby minimizing the chance of patient from falling or other injury. This information must be strategic and only alarmed when the individual or individuals are actually using the stair assist device. The invention can also be implemented to provide information to the caregiver when the patient is leaving a room, getting up from a chair, toilet, or bed. Wireless communication is now possible to provide the information on a common smart phone or tablet to the caregiver over a selected communication protocol built into the smart phone or tablet such as Bluetooth or Near Field Communication (NFC). The selected communication protocol is the protocol that is built into the caregiver smart phone or tablet. This makes the integration of the system easy to retrofit into existing building and homes. In particular, the present invention provides a remote transmitter that can withstand the rigors of day-to-day activity without falsely contacting or activating and is capable of communicating with the caregiver smart phone or tablet. More particularly, the invention provides a remote transmitter having a sensor port that is designed to receive inputs from one or more switches or sensors and providing feedback to the caregiver on the alarm status of the switch or sensor attached to the remote transmitter.

In a first aspect, the present invention provides a remote transmitter for use with a smart phone or tablet. Current smart phones and tablets utilize a number of communication technologies that are suitable for communicating with remote sensing devices which do not have a need for secondary wireless networks. These communication protocols currently include Bluetooth and NFC. The remote transmitter is comprise of a housing and a peer to peer communication circuit, such as a Bluetooth or NFC, and antenna coupled to the housing, a conventional switch or sensor detection circuit that is connected to the input switch or sensor by a cable that is capable of communicating the activation signal to the detection circuit. The remote transmitter can also have a thermometer in the device so that the caregiver can verify that the temperature conditions in the patient area are within suitable limits so that the patient is not uncomfortable. The temperature sensor can also be used to improve sensor signal accuracy by providing compensating calibration correction signals or algorithmic input to the detection circuit or microprocessor. The input device that is connectable to the remote transmitter can be selected from one of the following. A battery operated pressure sensor for the stair assist chair, a top of travel and bottom of travel sensor which is a stair assist utilization sensor that tells the caregiver that the stair assist device is not at the top of the bottom of the stairs or confirms which level the assist device is on. The travel position sensors can be combined with a timing device in the transmitting or receiving device or in software to determine if the stair assist chair has arrived at its logical destination within a practical time window. An accelerometer for the stair assist chair that tells the caregiver an erratic motion has occurred, such as the monitored individual falling from the assist chair or malfunction of the assist chair. The remote sensor can also be connected to a bed sensor mat that verifies that a patient or individual is in the bed or has gotten out of the bed, a chair sensor mat that verifies that a patient or individual is seated on the chair or has gotten out of the chair, a toilet sensor mat that verifies that a patient or individual is seated on the toilet or has gotten off of the toilet, a incontinence or dampness sensor to alert the caregiver if the patients bed has been wet by a liquid such as water or urine, a call button so that the patient can call the caregiver for help, a pulse monitor to alert the caregiver if the patient pulse has exceed a specific set point, a blood pressure monitor to alert the caregiver if the patient pulse has exceed a specific set point, a portal monitor that has the ability to sense the motion direction to determine if the motion is entering or exiting a portal.

Additionally the remote transmitted can be designed such that it is not active until an event occurs such as a sensor being active. For battery operated remote transmitter this will result in extended battery life because the remote transmitter electrical circuits do not have to be electrified all the time.

The user input of the present invention may comprise either discrete binary switched devices such as McMaster Carr 7090K37 or devices with proportional output signals in either analog such as Analog Devices ADXL327BC PZ-RL7, pulse width modulated such as Analog Devices ADXL213AE-ND, digitally encoded formats such as ST Microelectronics FC30TR or acceleration/impact switch such as Comus Group AS1303-0. To simplify installation and reduce cost the input devices can be battery operated or, in dynamic moving applications such as the stair assist application, the kinetic energy of the moving body can be harvested via harvesting technologies such as piezoelectric or electromagnetic systems In another aspect, the present invention provides a system using remotely activated transmitters to provide information to the caregiver via the use of a smart phone or tablet. In this embodiment, the system comprises a smart phone or tablet capable of receiving signals using the selected communication protocol and a remote transmitter having a signal transmitter and a signal processor attached to it and designed to receive information from the sensor. The system could also be configured with an optional smart phone or tablet PC configured with a text messaging protocol. The text messaging protocol can be Short Message Service (SMS) which is a text messaging service component of phone, web, or mobile communication systems. SMS uses standardized communications protocols to allow fixed line or mobile phone devices to exchange short text messages or any other internet messaging base protocol that can receive and send distinct message. The smart phone could be replaced with a properly configured tablet PC, which has the selected communication protocol so that it can receive signals from the sensors so that a remote caregiver can be alerted to a recent alarm conditions i.e. the patient is on the stair assist device, the patient is out of bed, the patient is off of the toilet, the patient is off of the chair, the thermal sensor is out of range, the incontinence/dampness sensor senses an out of range condition, The portal sensor sense a patient at the stair assist landing, the pulse sensor senses an out of range condition, the blood pressure sensor senses an out of range condition or the call button has been activated. A central tablet device could also be used as a base unit which can be activated by the signal received from the remote transmitter to send the appropriate message via SMS text to the caregiver's smart phone or tablet if they are out of range for the select communications protocol.

These and other embodiments of the present invention, as well as its advantages and features, are described in more detail in conjunction with the text below and attached figures.

Bearing in mind the problems and deficiencies of the prior art, it is therefore an object of the present invention to provide a monitoring system that can be added to a stair assist device to minimize the problems with falling for patients.

It is another object of the present invention to provide a fall management system that is wireless and can be readily incorporated into a home or healthcare facility.

An additional object of the present invention is to provide fall monitoring system that can work with a variety of sensor and switches to provide detailed information as to the patient's state.

A further object of the present invention to provide to provide a means of alerting the care giver to a patients movements in relationship to the stair assist device.

Another object of the present invention is to provide a method to provide a means of calling the caregiver for help from the stair assist device.

Still other objects and advantages of the invention will in part be obvious and will in part be apparent from the specification.

The above and other objects, which will be apparent to those skilled in the art, are achieved in the present invention which is directed to a providing a fall monitoring systems for stair assist devices.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 8 is a schematic showing the blood pressure monitor device FIG. 9 is a schematic showing the dampness monitor device FIG. 10 is a schematic showing the toilet monitor device FIG. 11 is a schematic showing the chair monitor device

DESCRIPTION OF THE PREFERRED EMBODIMENT(S)

In describing the preferred embodiment of the present invention, reference will be made herein to FIGS. 1-21 of the drawings in which like numerals refer to like features of the invention.

In an example, the present invention is a fall management system for use with a stair assist device to minimize the possibility of falling by a patient using a stair assist device to navigate stairs or ramps.

Figure 13:
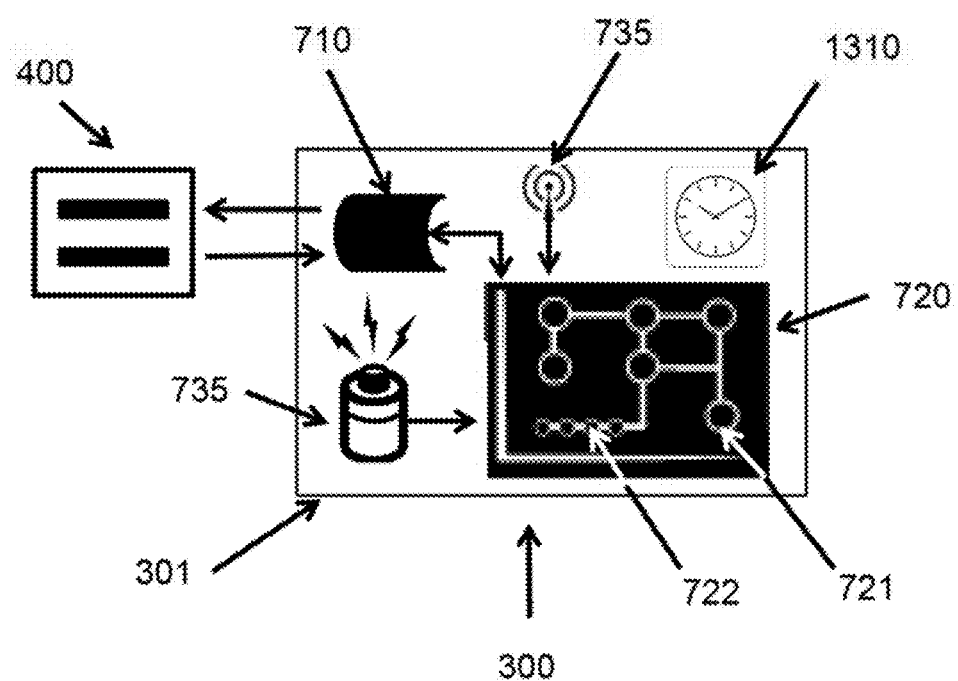
FIG. 13 is a schematic showing the more detailed view of typical remote transmitter device with analog to digital conversion circuit.
Figure 14:
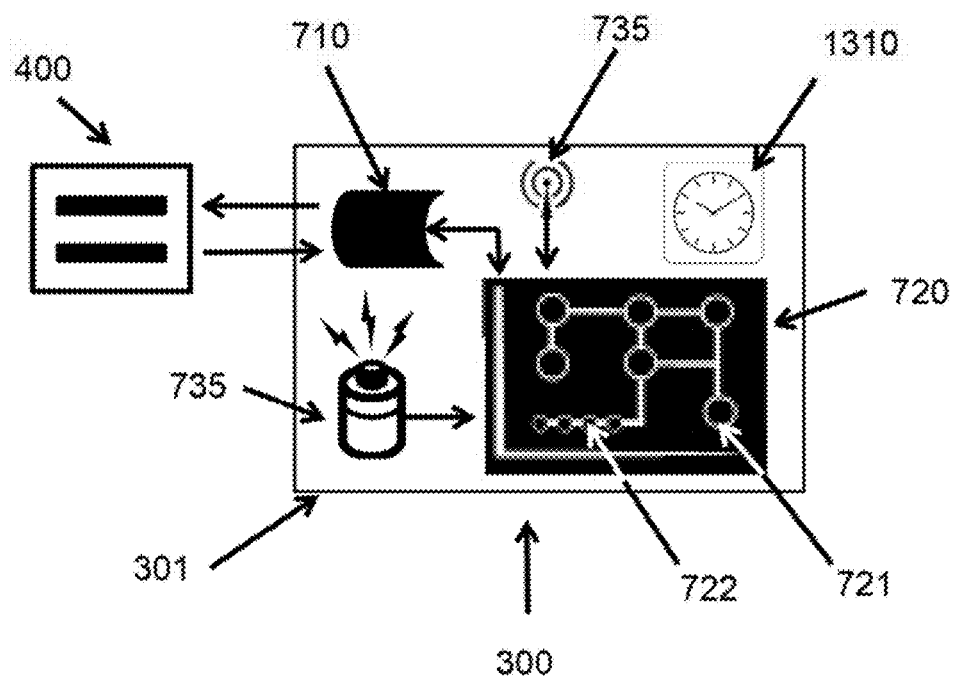
FIG. 14 is a schematic showing the more detailed view of typical remote transmitter device with a pulse width modulated conversion circuit.
Figure 15:
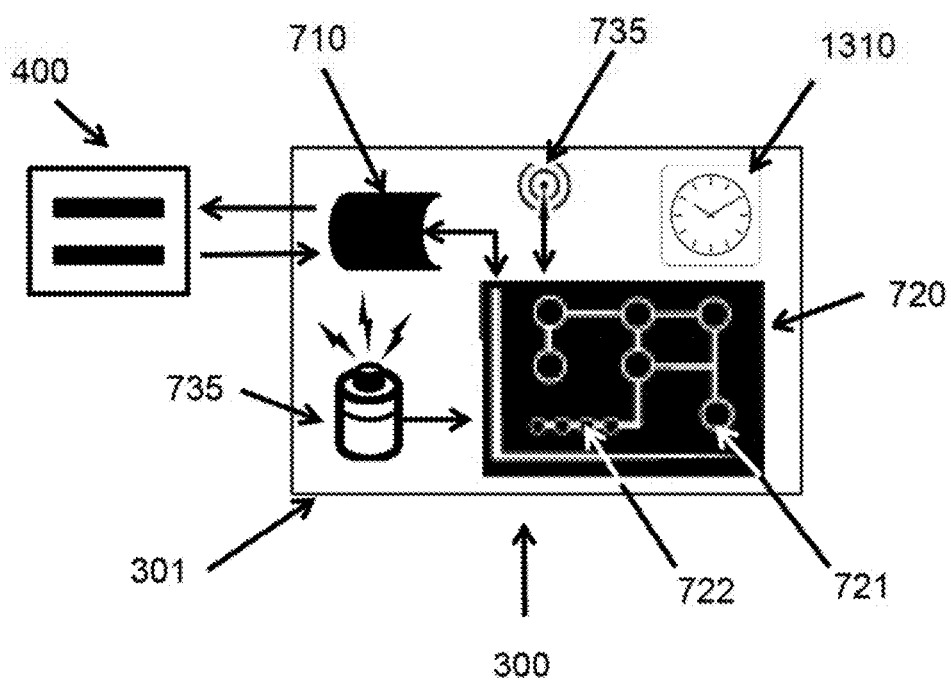
FIG. 15 is a schematic showing the more detailed view of typical remote transmitter device with a digital encoded detection circuit

The present invention provides devices, systems, and methods for monitoring mobility impaired patients that are utilizing a stair assist device to transit up and down stairs by activating a remote transmitter attached to sensors. In particular, the present invention is useful for providing a simple, rugged transmitter which can be operated from various input means. Although the device may find a variety of uses outside the realm of communications equipment, the device is particularly suited for use in communication with a smart phone or tablet utilized by a dedicated caregiver to mitigate patient leaving the care facility and minimizing the potential for falls for patients in their care. The system requires that an application or program reside on the Smart phone or tablet computer 50 shown in FIG. 1 which uses the same communication protocol Bluetooth or Near Field Communication (NFC) shown as 500, 505, 510, 520, 530, 540, 560, 570, 580, and 590 in FIG. 1. as the remote a remote transmitter 300, 305, 310, 320, 330, 340, 350, 360, 370, 380, 390 shown in FIG. 1 and FIGS. 2 through 11 or any combination which is selected by the customer. The caregiver then selects the modules that they want to monitor from a menu which allows them to select the remote transmitter 300, 305, 310, 320, 330, 340, 350, 360, 370, 380, 390 shown in FIG. 1 and FIGS. 2 through 11 and link them in the program to either stair assist, bed sensor, toilet sensor, chair sensor, thermal sensor, incontinence/dampness sensor, portal sensor, pulse sensor, blood pressure sensor, accelerometer, or call button as seen in FIG. 13 and FIG. 14. Additionally, as seen in FIG. 15, the smartphone or tablet 50 can be used as a base unit where it would stay in the facility where the patient or caregiver is monitoring a patient or individual and it can be configured to activated by the signal received to send the appropriate message, by messaging protocol which can be SMS message, to the caregivers smart phone or tablet if they are out of range for the select communications protocol.

Figure 1:
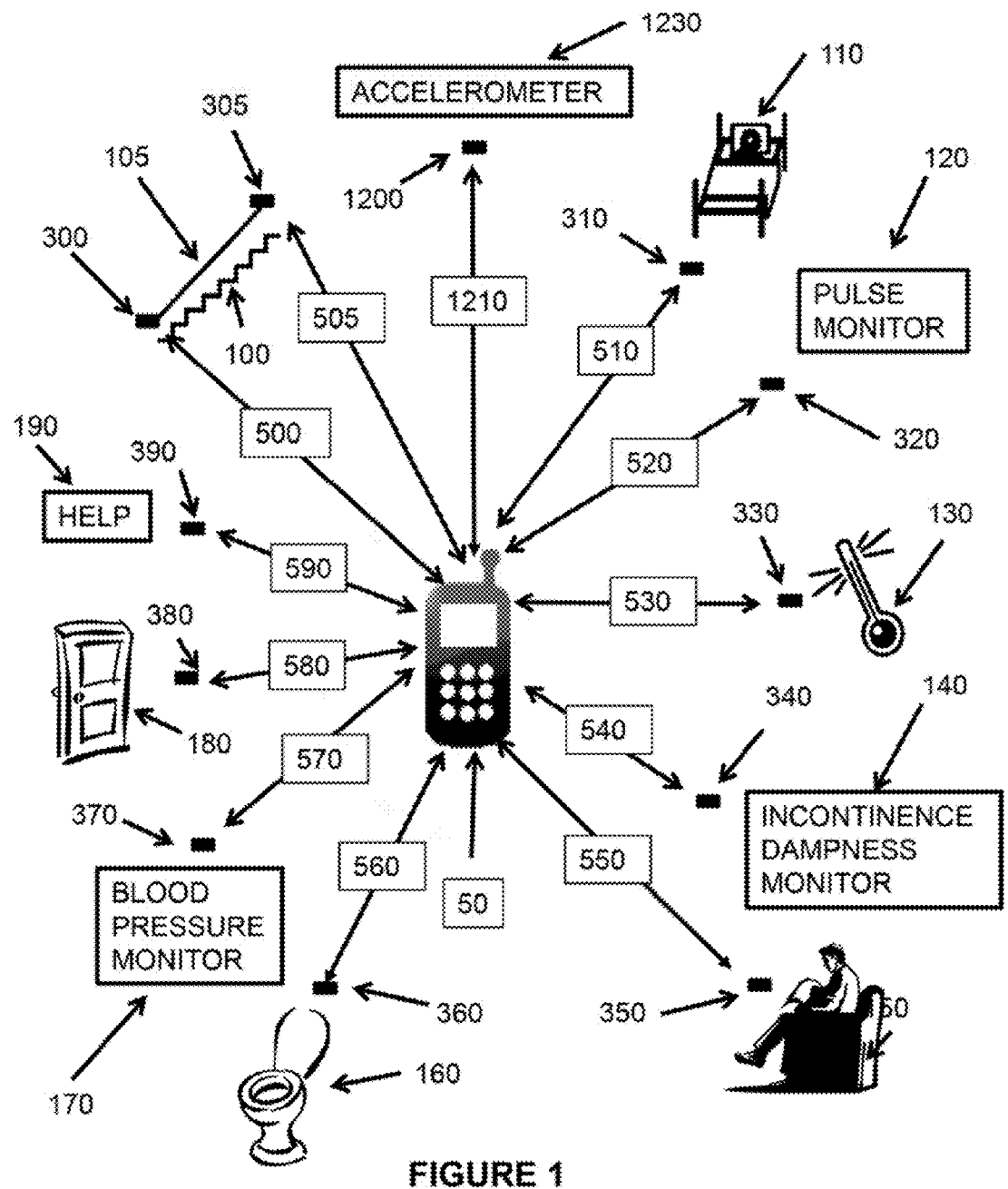
FIG. 1 is an overview of the operation of a remotely activated system.

FIG. 1 is a broad overview of a remotely activated system for use with the present invention. Utilizing FIGS. 2 through 11. The system generally comprises a remote transmitter 300, 305, 310, 320, 330, 340, 350, 360, 370, 380, 390, and 1200 shown in FIG. 1 and FIGS. 2 through 11 or any combination which is selected by the customer and a smart phone or tablet 50. The remote transmitters are in communication to switches or sensors 400, 405, 410, 420, 430, 440, 450, 460, 470, 480, 490, 1230 or any combination which is selected by the customer as shown on FIGS. 2 through 11.

Figure 2:
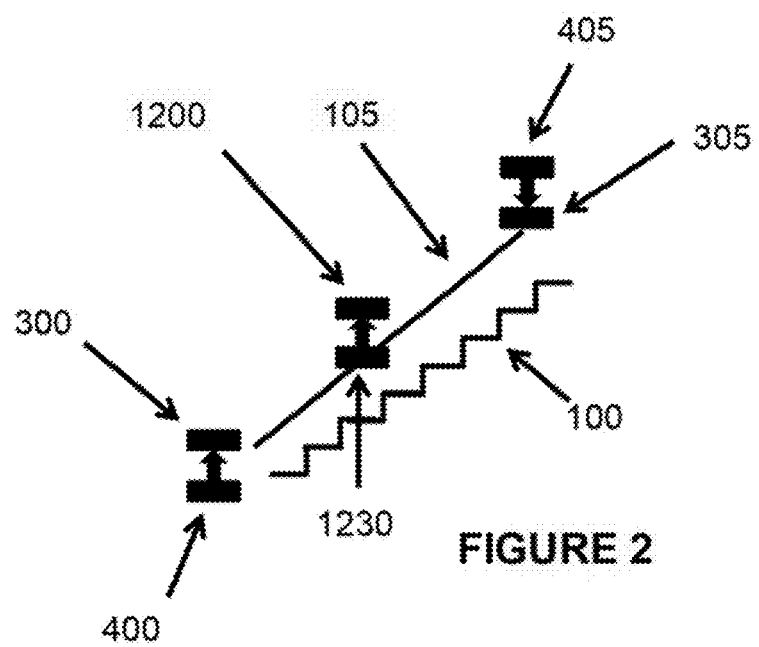
FIG. 2 is a schematic showing the stair assist device sensor and stair assist device
Figure 6:
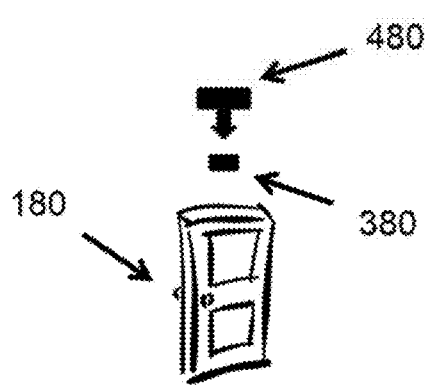
FIG. 6 is a schematic showing the portal monitor device
Figure 16:
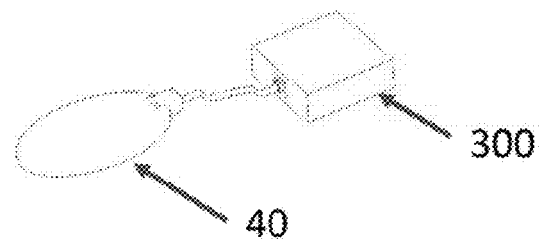
FIG. 16 is an isometric view of a typical remote transmitter device.
Figure 17:
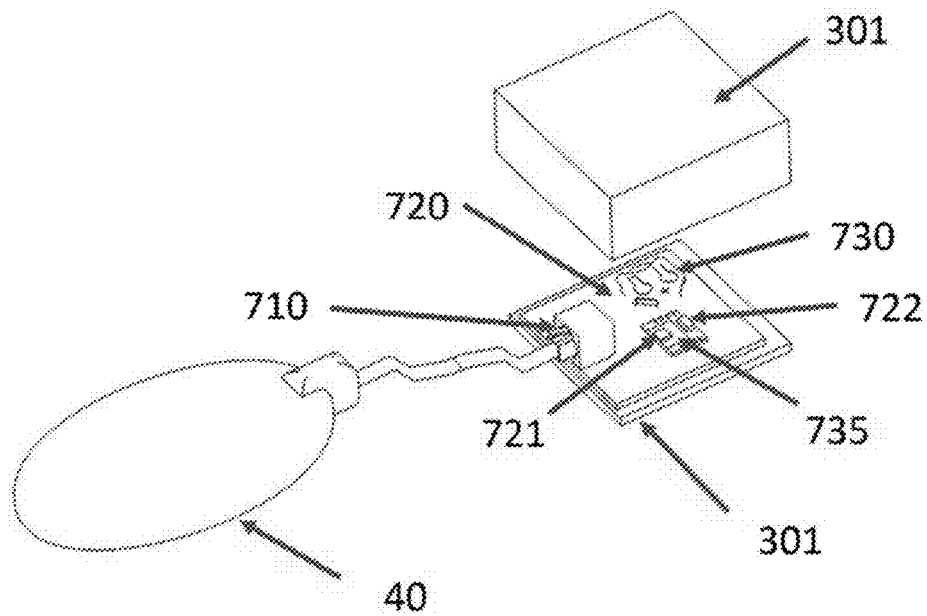
FIG. 17 is an exploded view of a typical remote transmitter device showing a normally open or normally closed detection transition detection circuit.
Figure 19:
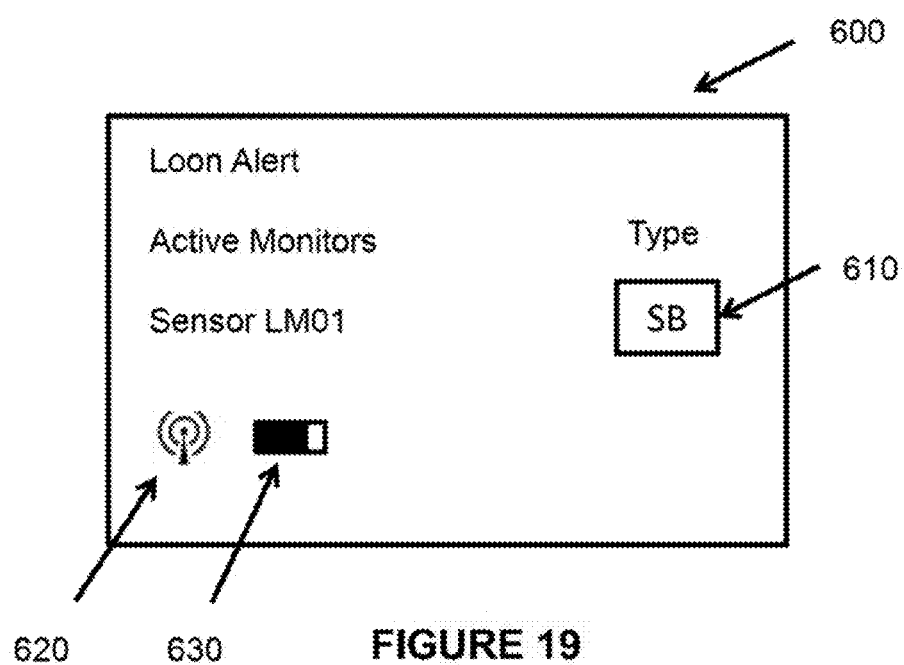
FIG. 19 is a Smart phone linking screen linked as stair assist sensor bottom of stairs
Figure 21:
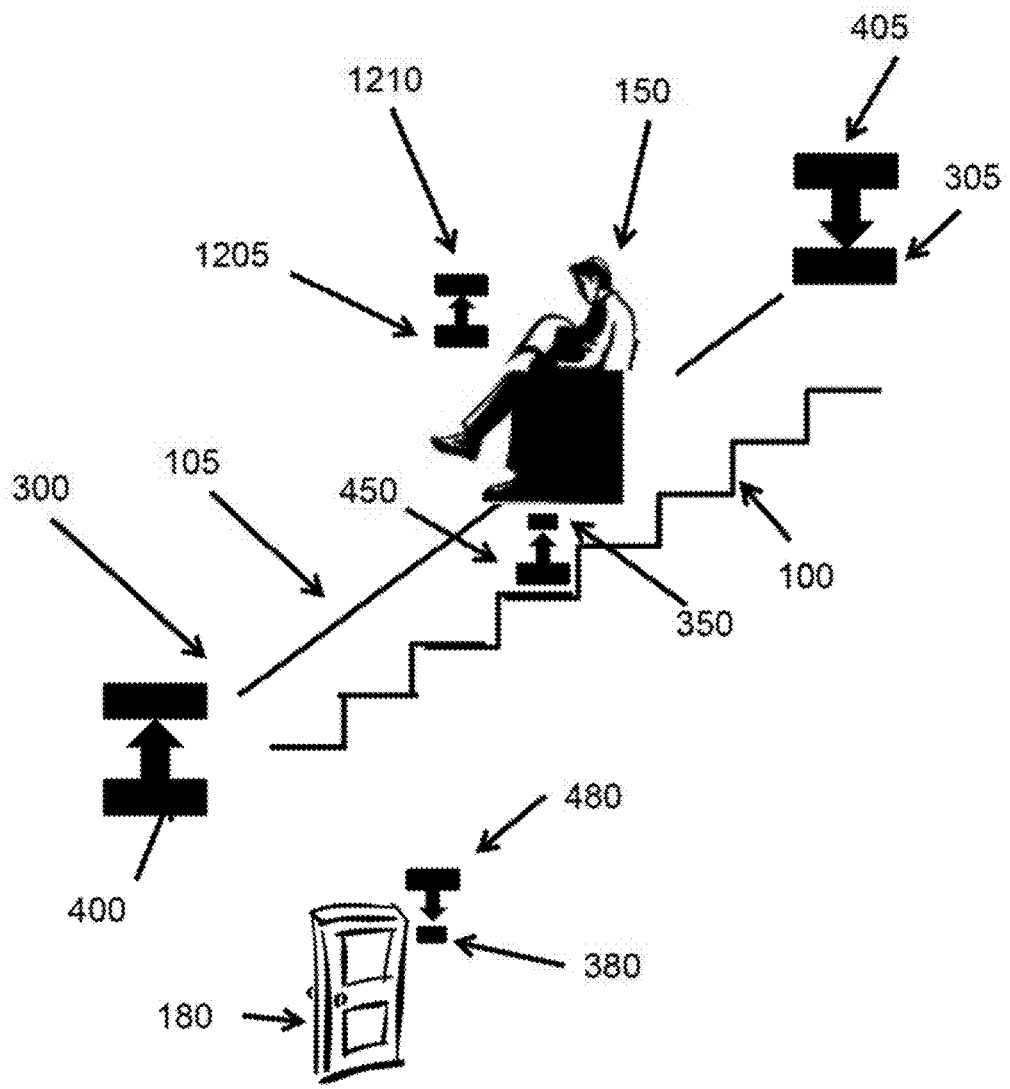
FIG. 21 is a schematic showing a partial stair assist system

As seen in FIGS. 1, 2 and 21, Stair assist device 100 has three remote transmitters 300, 305 and 1230 that are in communication with smart phone 50. When the stair assist is at the bottom of the stairs the sensor 400 transmits a signal to remote transmitter 300 which is in communication with smart phone or tablet 50 via communication protocol Bluetooth or Near Field Communication (NFC) wirelessly via peer to peer protocol 500 and 505 and displays a notification that the stair assist device 100 is parked at the bottom of the stairs. If the patient or individual move the stair assist device 100, then the sensor 400 transmits a signal to remote transmitter 300 which is in communication with smart phone or tablet 50 and displays a notification that the stair assist device 100 is not parked at the bottom of the stairs. This notifies the caregiver that the patient or individual is using the stair assist device and they can provide help as needed. When the patient or individual moves the stair assist device 100 to the top of the stairs, then the sensor 405 transmits a signal to remote transmitter 305 which is in communication with smart phone or tablet 50 and displays a notification that the stair assist device 100 is parked at the top of the stairs. When either sensor 400 or 405 transmit signals to remote transmitter 400 or 305 indicating the patient is moving, acceleration sensor 1210 communicates with remote transmitter 1240 which is communication with smart phone or tablet 50 the rate of movement which is monitored by smart phone or tablet looking for sudden changes in movement. Sudden or erratic changes display a notification that the stair assist has moved in an unexpected manner. When either sensor 400 or 405 transmit signals to remote transmitter 400 or 305 indicating the patient is moving, a timing circuit or software algorithm located in transmitter 1240 or smart phone or tablet 50 begins to count the amount of time between the top and bottom positions. Elapsed time greater or less than user adjustable levels displays notification the patient has experienced difficult achieving completion of the stair ascent or descent indicating a fall or inability to continue. Sensor 400 and 405 can be selected from either contact switches, such as McMaster Carr part number 7539K5, or non-contact magnetic switches, McMaster Carr part number 65985K15. Sensor 1210 can be a capacitive device such as Analog Devices part number ADXL334 When the stair assist device is also utilized with a mat type sensor, such as the ones found in hospital bed sensors, then the caregiver has two important pieces of information. The first being where is the stair assist device and the second being the patient is seated in the stair assist device. As seen in FIGS. 11 and 19, a stair assist seat sensor can be utilized using a chair sensor device 150 which has one remote transmitter 350 that is in communication with smart phone 50 via communication protocol Bluetooth or Near Field Communication (NFC) wirelessly via peer to peer protocol 550. When the patient or individual is on the stair assist chair 150 the sensor 450 transmits a signal to remote transmitter 350 which is in communication with smart phone or tablet 50 and displays a notification that the patient is sitting in the stair assist chair. Sensor 450 can be selected from Posey 8308 6-Month Chair Sensor or Stanley Healthcare Solutions Bed-Check Sensor. As seen in FIGS. 6 and 16, when at least one motion sensors using FIG. 6, portal monitor device 180, which can be selected from an infrared sensor, McMaster Carr part number 7477K36, or an ultrasonic sensor, McMaster Carr part number 7477K45, which has remote transmitters 380 that is in communication with smart phone 50 via communication protocol Bluetooth or Near Field Communication (NFC) wirelessly via peer to peer protocol 580. When the portal monitor senses a patient or individual entering the stair landing area, the sensor 480 transmits a signal to remote transmitter 380 which is in communication with smart phone or tablet 50 and displays a notification that the an patient or individual has entered the stair landing area which gives the caregiver advance notice that the patient intends to use the stair assist machine. If the portal monitor device 180 senses that a patient or individual has moved from the area being monitored, the portal monitor device 180 then communicates with the sensor 480 which transmits a signal to remote transmitter 380 which is in communication with smart phone or tablet 50 and displays a notification that the patient or individual has entered the stair landing area. This notifies the caregiver that the patient or individual is moving to the stairs and the caregiver can react to the problem before the patient mounts the stair assist machine. Once the patient has been assisted, the caregiver can acknowledge the alarm and turn it off on the smartphone or tablet 50. The utilization of the three monitors provides the caregiver with the location of the patient in reference to the stair assist machine and the caregiver has received additional information which they can use to prevent a fall or injury. If two portal monitors 180 are used, then the additional information is provided as to whether the patient is at the top or the bottom of the stairs. This allows the caregiver to analyze whether they need to provide assistance. If the patient is at the bottom of the stairs because the down stairs portal monitor 180 is on and the stair assist position 405 shows the stair assist machine to be at the top of the stairs then they may not need to react as quickly because the stair assist machine is not available for the patent use. This invention of the remote transmitter also allows the invention to assist the caregiver with other fall prevention and patient monitoring functions.

Figure 4:
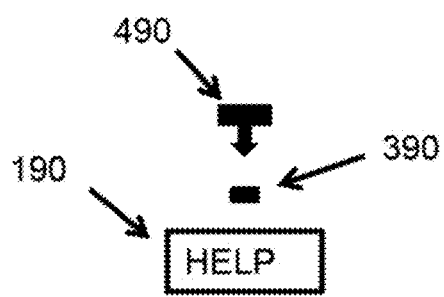
FIG. 4 is a schematic showing the call for help button

Alternatively, the stair assist monitoring system can have a call for help button as seen in FIGS. 1 and 4. Call for help button device 190 has one remote transmitter 390 that is in communication with smart phone 50 via communication protocol Bluetooth or Near Field Communication (NFC) wirelessly via peer to peer protocol 590. When the patient or individual activates the call for help button 190, the button sensor 490 transmits a signal to remote transmitter 390 which is in communication with smart phone or tablet 50 and displays a notification that the patient needs help or assistance. When the caregiver has provided the assistance, the caregiver acknowledges it on the smartphone or tablet 50 and call for help button notification on the smart phone of tablet 50 is canceled.

Figure 3:
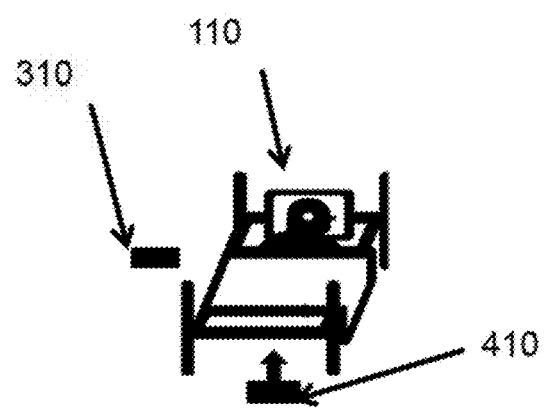
FIG. 3 is a schematic showing the bed sensor device

As seen in FIGS. 1 and 3, bed sensor device 200 has one remote transmitter 310 that is in communication with smart phone 50 via communication protocol Bluetooth or Near Field Communication (NFC) wirelessly via peer to peer protocol 510. When the patient or individual shown on bed 200 is in the bed the bed sensor 410 transmits a signal to remote transmitter 310 which is in communication with smart phone or tablet 50 and displays a notification that the patient is in bed. When the patient gets out of bed 200 bed sensor 410 transmits a signal to remote transmitter 310 which is in communication with smart phone or tablet 50 and displays a notification that the patient is out of bed 200.

As seen in FIGS. 1 and 4, a separate call for help button can be incorporated into the system, most like likely at the top or bottom of the stairwell, device 190 has one remote transmitter 390 that is in communication with smart phone 50 via communication protocol Bluetooth or Near Field Communication (NFC) wirelessly via peer to peer protocol 590. When the patient or individual activates the call for help button 190, the button sensor 490 transmits a signal to remote transmitter 390 which is in communication with smart phone or tablet 50 and displays a notification that the patient needs help or assistance. When the caregiver has provided the assistance the caregiver acknowledges it on the smartphone or tablet 50 and call for help button notification on the smart phone of tablet 50 is canceled.

Figure 5:
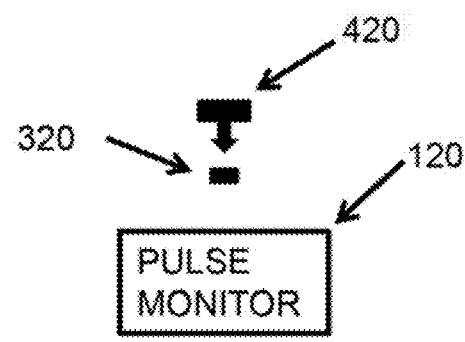
FIG. 5 is a schematic showing the pulse monitor device

As seen in FIGS. 1 and 5, pulse monitor device 120 has one remote transmitter 320 that is in communication with smart phone 50 via communication protocol Bluetooth or Near Field Communication (NFC) wirelessly via peer to peer protocol 520. The pulse monitor has two set points not shown which are configurable by the caregiver, a high pulse or a low pulse rate. When the pulse monitor senses an out of normal condition for the patient or individual, either high or low, it activates the call for pulse monitor 120 and the sensor 420 transmits a signal to remote transmitter 320 which is in communication with smart phone or tablet 50 and displays a notification that the patient or individuals pulse is either too high or too low. When the caregiver has provided the assistance, the caregiver acknowledges it on the smartphone or tablet 50 and pulse monitor notification on the smart phone of tablet 50 is canceled.

As seen in FIGS. 1 and 6, portal monitor device 180 can be incorporated into the system, most like likely at the top or bottom of the stairwell, and has remote transmitters 380 that is in communication with smart phone 50 via communication protocol Bluetooth or Near Field Communication (NFC) wirelessly via peer to peer protocol 580. When the portal monitor senses a patient or individual entering the area under surveillance by the caregiver, the sensor 480 transmits a signal to remote transmitter 380 which is in communication with smart phone or tablet 50 and displays a notification that the an patient or individual has entered the area under surveillance. If the portal monitor device 180 senses that a patient or individual has moved from the area being monitored, the portal monitor device 180 then communicates with the sensor 480 which transmits a signal to remote transmitter 380 which is in communication with smart phone or tablet 50 and displays a notification that the patient or individual has left the area under surveillance. This notifies the caregiver that the patient or individual is leaving the area where they should be and the caregiver can react to the problem before the patient leaves the area. Once the issue has been addressed the caregiver can acknowledge the alarm and turn it off on the smartphone or tablet 50.

Figure 7:
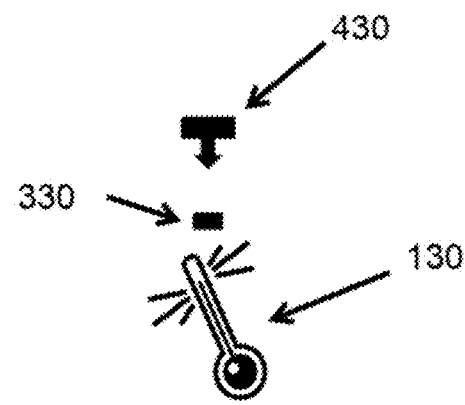
FIG. 7 is a schematic showing the Temperature monitor device
Figure 12:
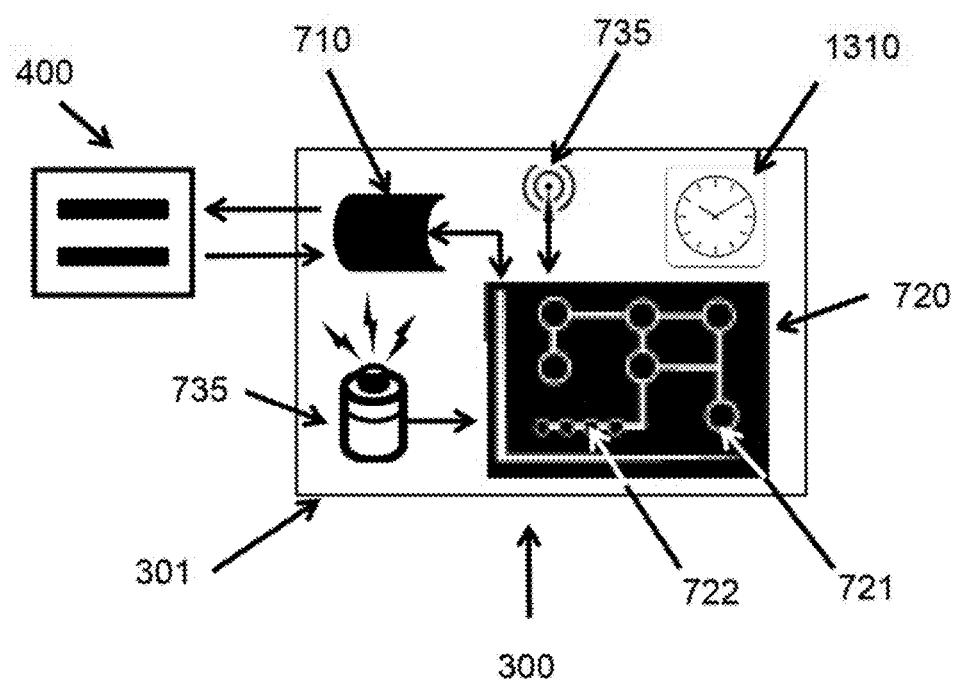
FIG. 12 is a schematic showing the typical remote transmitter device with normally open or normally closed detection transition detection circuit.

As seen in FIGS. 1 and 7, temperature device 130 has one remote transmitter 330 that is in communication with smart phone 50 via communication protocol Bluetooth or Near Field Communication (NFC) wirelessly via peer to peer protocol 530. The temperature monitor has two set points not shown, which are configurable by the caregiver a high temperature or a low temperature. When the temperature monitor senses an out of normal condition for the patient or individual, either high or low, it activates the call for temperature sensor 130 and the sensor 430 transmits a signal to remote transmitter 330 which is in communication with smart phone or tablet 50 and displays a notification that the patient or individual's temperature is either too high or too low. When the caregiver has provided the assistance, the caregiver acknowledges it on the smartphone or tablet 50 and temperature monitor notification on the smart phone or tablet 50 is canceled.

As seen in FIGS. 1 and 8, blood pressure monitor device 170 has one remote transmitter 370 that is in communication with smart phone 50 via communication protocol Bluetooth or Near Field Communication (NFC) wirelessly via peer to peer protocol 570. The blood pressure monitor has two set points not shown which are configurable by the caregiver a high blood pressure or a low blood pressure. When the blood pressure monitor 170 senses an out of normal condition for the patient or individual, either high or low, it activates the sensor 470 which transmits a signal to remote transmitter 370 which is in communication with smart phone or tablet 50 and displays a notification that the patient or individual's blood pressure is either too high or too low. When the caregiver has provided the assistance the caregiver acknowledges it on the smartphone or tablet 50 and blood pressure monitor notification on the smart phone of tablet 50 is canceled.

As seen in FIGS. 1 and 9, incontinence/dampness sensor device 140 has one remote transmitter 340 that is in communication with smart phone 50 via communication protocol Bluetooth or Near Field Communication (NFC) wirelessly via peer to peer protocol 540. The incontinence/dampness sensor monitor has one set point not shown which are configurable by the caregiver to signal an incontinence event. When the incontinence/dampness sensor monitor 140 senses an out of normal condition for the patient or individual, it activates the sensor 440 which transmits a signal to remote transmitter 340 which is in communication with smart phone or tablet 50 and displays a notification that the patient or individuals blood pressure is either too high or too low. When the caregiver has provided the assistance the caregiver acknowledges it on the smartphone or tablet 50 and incontinence/dampness sensor monitor notification on the smart phone of tablet 50 is canceled.

As seen in FIGS. 1 and 10, toilet sensor device 160 has one remote transmitter 360 that is in communication with smart phone 50 via communication protocol Bluetooth or Near Field Communication (NFC) wirelessly via peer to peer protocol 560. When the patient or individual is on the toilet 160 the toilet sensor 460 transmits a signal to remote transmitter 360 which is in communication with smart phone or tablet 50 and displays a notification that the patient is on the toilet. When the patient gets off of the toilet, 160 toilet sensor 460 transmits a signal to remote transmitter 360 which is in communication with smart phone or tablet 50 and displays a notification that the patient is off of the toilet 160.

As seen in FIGS. 1 and 11, chair sensor device 150 can be incorporated into the system, most likely in a chair positioned for the comfort of the patient at the top or bottom of the stairwell, and has one remote transmitter 350 that is in communication with smart phone 50 via communication protocol Bluetooth or Near Field Communication (NFC) wirelessly via peer to peer protocol 550. When the patient or individual is on the chair 150 the chair sensor 450 transmits a signal to remote transmitter 350 which is in communication with smart phone or tablet 50 and displays a notification that the patient is sitting in the chair. When the patient gets off of the chair 150, chair sensor 450 transmits a signal to remote transmitter 350 which is in communication with smart phone or tablet 50 and displays a notification that the patient has gotten off of the chair 150.

As seen in FIGS. 12, 13, 14, 15, 16 and 17 schematics showing the typical remote transmitter device using remote transmitter 300 for the stair assist device as an example. The remote transmitter 300 is comprised of the plastic housing 301, electronics board 720 which has the selected communication protocol 721 built into it, such as Blue Giga's BLE 112A Module for Bluetooth protocol or equivalent modules for Near Field Communication (NFC). Electronic board 720 is the two way signal transmitter that can send and receive information to the smart phone 50 shown in FIG. 1 and it is coupled to the housing 301. A sensor control section 722 which such as a normally open or normally closed detection transition detection, 1310 which an analog to digital conversion circuit, 1320 which is a pulse width modulated conversion circuit, or 1330 which a digital encoded detection circuit is coupled to the housing 301 which is in communication to a sensor connector 710 and it is coupled to the housing 301 which is in communication with the sensor 400. An energy storage module 730 is in communication with electronics board 720 and provides power for the electronics package for electronics board 720. The energy storage module can be selected from either a battery or energy harvesting device as shown in U.S. Patent Application 20080129153A1 the disclosures of which are incorporated herein by reference. The energy storage module 730 is in communication with electronics board 720 and provides power for the electronics package for electronics board 720. An antenna 735 is attached to electronics board 720 which is in communication with smart phone or tablet 50 not shown. If a Battery is used for energy storage module 730 it can either be selected from primary battery such as an alkaline battery or a rechargeable battery such as a li-ion battery.

Figure 18:
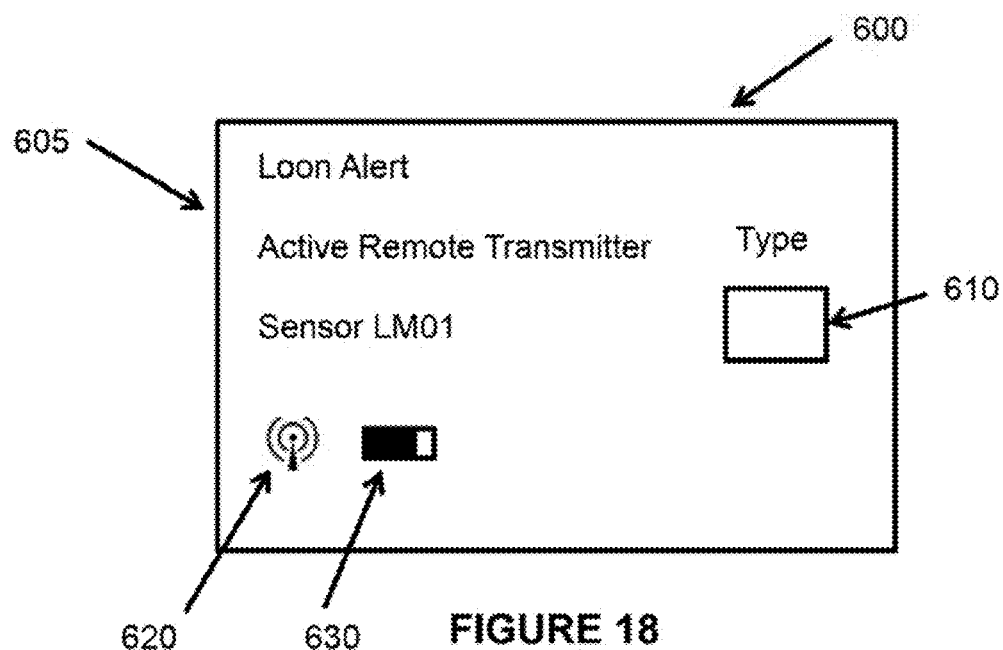
FIG. 18 is a Smart phone linking screen.

As illustrated in FIG. 18, the smart phone linking screen which is shown on the smart phone or tablet 50 for linking the remote transmitter to, in this case stair assist device 300, the smart phone or tablet 50. The screen 600 shows the active remote transmitters available 605 and data input place 610. It also shows that it is communicating with antenna icon 620 and that the battery life icon 630 in the remote transmitter is acceptable. The smart phone can link to as many sensors as it needs to but ideally no more than 5 sensors are linked to one smart phone 50

As illustrated in FIG. 19, the smart phone linking screen which is shown on the smart phone or tablet 50 for linking the remote transmitter to, in this case stair assist device 300, the smart phone or tablet 50. The screen 600 shows the active remote transmitters available 605 and data input place 610. The caregiver has entered a SB for stair assist bottom in data input place 610. The caregiver would enter ST for stair assist top, BS for bed sensor, PM for pulse monitor, CS for call for help button, DM for portal monitor, TM for temperature monitor, BP for blood pressure monitor, IM for Incontinence monitor, TM for toilet monitor. The smart phone can link to as many sensors as it needs to but ideally no more than 5 sensors are linked to one smart phone 50

Figure 20:
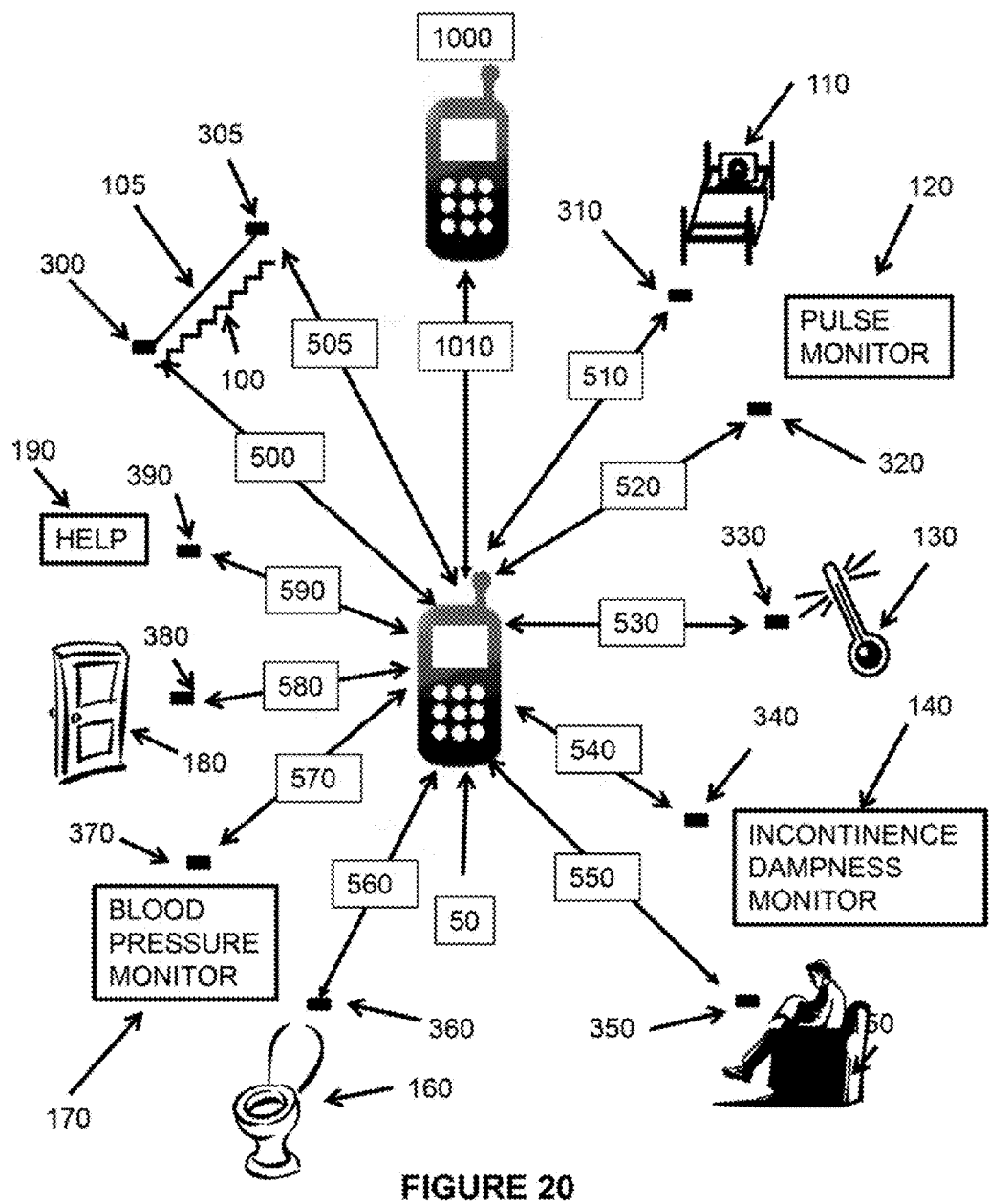
FIG. 20 is a Smart phone or tablet can be used as a base unit to communicate via SMS messaging to caregiver on remote phone

As illustrated in FIG. 20, the smartphone or tablet 50 can be used as a base unit where it would stay in the facility where the patient or caregiver is monitoring a patient or individual and it can be configured to activated by the signal received to send the appropriate message, either SMS message to the caregivers smart phone or tablet if they are out of range for the select communications protocol, The smart phone or tablet 50 sends SMS message via wireless communication link 1010 to remote phone of caregiver 1000. This configuration when test provided both the caregiver and the patient's child who was using the remote phone of caregiver 1000 information with respect to the care and safety of the patient. This also allowed the remote caregiver to contact the local caregiver with any questions or concerns thereby providing increased security for the patient.

As illustrated, the invention provides wireless, instantaneous information about the patients when using a stair assist device which allows the caregiver to provide the appropriate assistance to minimize the opportunity for a fall to occur when the patient uses a stair assist device. The invention of the remote transmitter also provides the ability for the caregiver in a local or remote location to get input as to the patient use of the stair assist device and provide the ability to monitor a number of other important conditions to insure the safety and health of the patient.

Although the foregoing invention has been described in detail for purposes of clarity of understanding, it will be obvious that certain modifications may be practiced within the scope of the appended claims.

It will be appreciated that the present invention enables the caregiver to monitor the stair assist device and patient utilization of it as well as to provide monitoring of other patient states where there is a possibility of the patient falling. In addition, the present invention provides a remote transmitter capable of interfacing with temperature, pulse and blood pressure monitor. The invention also provides a remote transmitter capable of interfacing with a patient call for assistance button.

The object of a remote transmitter which is incorporated into a stair assist device and capable of interfacing with different switches and sensors has been met.

The object of the present invention to provide a remote transmitter which is incorporated into a stair assist device and capable of interfacing with a smart phone or tablet with has been met.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

We claim:

1. A stair assist monitoring system comprising:
    a) a top remote switch positioned at a top of a flight of stairs configured to provide a signal when a stair assist device is at the top of the stairs;
    b) a bottom remote switch positioned at a bottom of the flight of stairs, configured to provide a signal when the stair assist device is at the bottom of the stairs;
    c) an intermediate remote switch positioned between the top and bottom of the flight of stairs configured to provide a signal when the stair assist device is between the top and the bottom of the flight of stairs;
    wherein the signals provided by the remote switches indicate a position of the stair assist device on the stairs; and
    d) a plurality of portal monitor devices, wherein one or more of the portal monitor devices send signals based on location of a person attempting to use the stair assist device and said switches signals to a remote electronic device, which is configured to notify a caregiver of the location of the person relative to a location of the stair assist device as signaled by the remote switches.

2. The monitoring system of claim 1 further comprises an acceleration sensor on the stair assist device to provide a signal indicating the speed of the stair assist.

3. The monitoring system of claim 1 further comprising a timing circuit in communication with the top and bottom switches and configured to count the amount of time between the top and bottom positions.

4. The monitoring system of claim 1 wherein the switches comprise transmitters to send the respective signals.

5. The monitoring system of claim 1 wherein the switches are contact switches.

6. The monitoring system of claim 1 wherein the switches are non-contact magnetic switches.

7. The monitoring system of claim 1 further comprising a seat sensor to provide a signal indicating that a person is seated on the stair assist device.

8. The MO wring system of claim 1, further comprising a remote sensor distal from the stair assist device, wherein the remote sensor is selected from the group consisting of a bed sensor, a temperature sensor, a button sensor, a pulse sensor, and a portal sensor.

9. A ramp assist monitoring system comprising:
a) a top remote switch positioned at a top of a ramp configured to provide a signal when a ramp assist device is at the top of the stairs;
b) a bottom remote switch positioned at a bottom of the ramp, configured to provide a signal when the ramp assist device is at the bottom of the ramp;
c) an intermediate remote switch positioned between the top and bottom of the ramp configured to provide a signal when the ramp assist device is between the top and the bottom of the ramp;
wherein the signals provided by the remote switches indicate a position of the ramp assist device on the ramp; and
d) a plurality of portal monitor devices, wherein one or more of the portal monitor devices send signals based on location of a person attempting to use the stair assist device and send switches signals to a remote electronic device, which is configured to notify a caregiver of the location of the person relative to a location of the stair assist device as signaled by the remote switches.

10. The monitoring system of claim 9 further comprises an acceleration sensor on the ramp assist device to provide a signal indicating the speed of the ramp assist device.

11. The monitoring system of claim 9 further comprising a timing circuit in communication with the top and bottom switches and configured to count the amount of time between the top and bottom positions.

12. The monitoring system of claim 9 wherein the switches comprise transmitters to send the respective signals.

13. The monitoring system of claim 9 wherein the switches are contact switches.

14. The monitoring system of claim 9 wherein the switches are non-contact magnetic switches.

15. The monitoring system of claim 9 further comprising a seat sensor to provide a signal indicating that a person is seated on the ramp assist device.

16. The monitoring system of claim 9 further comprising a remote sensor distal from the ramp assist device, wherein the remote sensor is selected from the group consisting of a bed sensor, a temperature sensor, a button sensor, a puke sensor, and a portal sensor.

17. A stair assist monitoring system comprising:
a) a top remote switch positioned at a top of a flight of stairs configured to provide a signal when a stair assist device is at the top of the stairs;
b) a bottom remote switch positioned at a bottom of the flight of stairs, configured to provide a signal when the stair assist device is at the bottom of the stairs;
c) an intermediate remote switch positioned between the top and bottom of the flight of stairs configured to provide a signal when the stair assist device is between the top and the bottom of the flight of stairs;
d) a remote sensor distal from the ramp assist device, wherein the remote distal sensor is selected from the group consisting of a bed sensor, a temperature sensor, a button sensor, a pulse sensor, and a portal sensor;
wherein output signals provided by the remote sensor distal from the ramp assist device displays a notification on said stair assist monitoring system that the individual needs assistance; and
e) a plurality of portal monitor devices, wherein one or more of the portal monitor devices send signals based on location of a person attempting to use the stair assist device and said switches signals to a remote electronic device, which is configured to notify a caregiver of the location of the person relative to a location of the stair assist device as signaled by the remote switches.

* * * * *